United States Patent
Cenciotti et al.

(10) Patent No.: US 8,566,380 B2
(45) Date of Patent: Oct. 22, 2013

(54) DEVICE FOR DFT CALCULATION

(75) Inventors: Andrea Cenciotti, Hamburg (DE);
Nestor Lucas Barriola, Stafa (CH);
Philip John Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 738 days.

(21) Appl. No.: 12/744,903

(22) PCT Filed: May 15, 2008

(86) PCT No.: PCT/EP2008/056001
§ 371 (c)(1),
(2), (4) Date: May 26, 2010

(87) PCT Pub. No.: WO2009/095087
PCT Pub. Date: Aug. 6, 2009

(65) Prior Publication Data
US 2010/0306298 A1 Dec. 2, 2010

(30) Foreign Application Priority Data
Jan. 31, 2008 (EP) ...................... 08150926

(51) Int. Cl.
*G06F 17/14* (2006.01)
(52) U.S. Cl.
USPC ........................................ 708/405
(58) Field of Classification Search
None
See application file for complete search history.

(56) References Cited

U.S. PATENT DOCUMENTS

| | | | | |
|---|---|---|---|---|
| 4,604,721 A | * | 8/1986 | Gray | 708/405 |
| 4,829,465 A | | 5/1989 | Knauer | |
| 4,972,358 A | | 11/1990 | Welles, II et al. | |
| 5,748,514 A | | 5/1998 | Okada et al. | |
| 6,061,705 A | | 5/2000 | Hellberg | |
| 8,356,064 B1 | * | 1/2013 | Chen et al. | 708/404 |
| 2004/0236808 A1 | | 11/2004 | Chen et al. | |
| 2007/0198623 A1 | * | 8/2007 | Karino | 708/404 |
| 2007/0224965 A1 | | 9/2007 | Brenner | |

FOREIGN PATENT DOCUMENTS

| | | |
|---|---|---|
| JP | 8329047 A | 12/1996 |
| JP | 2002501253 A | 1/2002 |
| TW | I220716 B | 9/2004 |
| WO | 9938089 A1 | 7/1999 |

OTHER PUBLICATIONS

International Search Report & Written Opinion—PCT/EP2008/056001, International Search Authority—European Patent Office, Jun. 1, 2010.

* cited by examiner

*Primary Examiner* — David H Malzahn
(74) *Attorney, Agent, or Firm* — Howard Seo

(57) ABSTRACT

A device to perform DFT calculations, for example in a GNSS receiver, including two banks of multipliers by constant integer value, the values representing real and imaginary part of twiddle factors in the DFT. A control unit selectively routes the data through the appropriate multipliers to obtain the desired DFT terms. Unused multipliers are tied to constant input values, in order to minimize dynamic power.

27 Claims, 3 Drawing Sheets

DEVICE FOR DFT CALCULATION

FIELD OF THE INVENTION

The present invention concerns a DFT (Discrete Fourier Transform) processor adapted in particular, but not exclusively, for integration in a receiver for a Global Navigation Satellite Systems (GNSS). Embodiments of the present invention relate to a power and area optimized architecture based on selectively activation of single DFT lines.

RELATED ART

The Fourier Transform (FT) is a function that converts a signal from the time domain into the frequency domain. In the case of discrete signals of finite duration $\{x_0, \ldots, x_{N-1}\}$ the Fourier Transform is often referred to as Discrete Fourier Transform (DFT).

Fourier Transforms are applied, among many other applications, in demodulation and processing of GPS, Galileo, GLONASS, and other GNSS signals. In these applications, the Fourier Transform applied to the received data allows to process several carrier frequencies in a parallel fashion, with an important reduction of hardware complexity. Modern GNSS receiver or processors include in most cases a "DFT engine", that is a section that is especially dedicated to the calculation of DFTs.

The theory and details of FT-based GNSS signal processing are known in the art, and will not be discussed at length in the present specification. Exhaustive information can be found in the available literature, for example in the book edited by E. D: Kaplan and C. Hegarty "Understanding GPS and its applications", $2^{nd}$ edition, Published by Artech House, London (December 2005), which is hereby incorporated by reference.

The definition of a DFT point $X_k$ for the mentioned finite sampled signal $\{x_N\}$ is:

$$X_k = \sum_{n=0}^{N-1} x_n \cdot e^{-j\frac{2\pi}{N}kn} \quad k = 0, 1, \ldots, N-1 \quad (1)$$

$$X_k = \sum_{n=0}^{N-1} x_n \cdot W_N^{kn} \quad (2)$$

where $W_N^{kn}$ are the $N^{th}$ order complex roots of the unit, also called "twiddle factors" or, writing explicitly the real and imaginary parts of the sum terms in (1):

$$x_n = I + jQ \quad (3)$$

$$W_N^{kn} = \cos\left(\frac{2\pi}{N}kn\right) + j \cdot \sin\left(\frac{2\pi}{N}kn\right) := C_I + j \cdot C_Q$$

$$x_n \cdot W_N^{kn} = (I \cdot C_I - Q \cdot C_Q) + j(I \cdot C_Q + Q \cdot C_I) \quad (4)$$

Equation (1) can thus be expressed as a sum of DFT terms $x_n \cdot W_N^{kn}$. The number of DFT terms needed to compute all the $X_k$ points is $N^2$ but each will require 4 multiplications and 2 additions.

An efficient algorithm to calculate the DFT is the well known Fast Fourier Transform (FFT) that is based on a split and conquers approach. If the N (power of 2) samples data stream is halved and processed in parallel, the computation order is reduced to $N^2/2$ complex additions and $(N^2/2+N)$ complex multiplications. As the number of possible splits is equal to $\log_2(N)$ then it follows that the computation order is given by $N \cdot \log_2(N)$ complex additions and $N \cdot \log_2(N)/2$ complex multiplications.

The use of the FFT algorithm is generally considered the most efficient way of calculating N DFT points from N samples. However, there are certain DFT configurations where the FFT algorithm is not optimal. For instance in those applications where only a reduced set of M DFT lines is required (with M≤N), as it is often the case in signal processing and in particular in GNSS processors, the computation order of the FFT architecture is not optimized.

Moreover, the FFT algorithm takes its simplest and most efficient form only if N is a power of two. Variant FFT algorithm for an arbitrary N exist, but they are in general less efficient.

In a GNSS signal processor, the DFT computation reflects directly on cost, silicon area and power consumption of the receiver. There is therefore a need to provide a DFT algorithm having the lowest possible computation load.

The Fourier transform can be regarded as a spectral factorization of a function in the time domain over an orthonormal base of sine and cosine functions. Many other discrete integral transforms are relevant in signal processing techniques, corresponding to different orthonormal bases. These transforms include, for example, the Cosine transform (DCT) and its various modifications (MDCT), the discrete Hartley transform (DHT) and many others. The foregoing specification refers, for simplicity's sake, to the DFT transform only. It must be understood, however, that the present invention is not limited to this particular case, but include all the discrete integral transforms to which it applies.

It is an aim of the present invention to provide a more efficient algorithm to compute a set of DFT lines in a signal processor for processing GNSS signals. The present invention aims moreover to provide a low-power GNSS receiver.

BRIEF SUMMARY OF THE INVENTION

The goals of the present invention are achieved by the object of the appended independent claims, the variants of the dependent claims incorporating important, but not strictly essential features. The invention will be better understood referring to the detailed description of some embodiments, which is provided by way of example only, and to the drawings that illustrate schematically:

DETAILED DESCRIPTION OF THE INVENTION

The present invention is based on the observation that GNSS processing requires the calculation, in general of a limited number of DFT lines. Twiddle factors used in GNSS DFT engine are a finite set and, moreover, have special symmetry properties in their real and imaginary parts. The invention thus proposes an optimised DFT algorithm that is able to calculate a reduced set M of DFT lines from N samples (with M≤N) being N not necessarily a power of 2, which takes advantage from these symmetries.

For these purposes data format considerations, dynamical disabling of non-used DFT lines and routing-effective design partitioning have to be taken into account.

Figure 1:
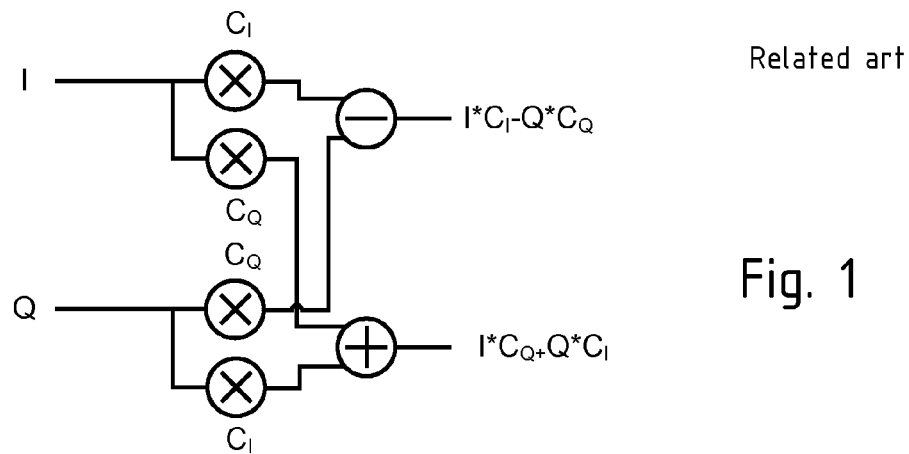
FIG. 1: a known implementation of a DFT computing.

A direct DFT implementation, as illustrated on FIG. 1, is based on 4 multipliers and 2 adders needed to calculate the real and imaginary part of equation (4). This is normally referred as a full butterfly circuit or algorithm. The coefficient $C_I$, $C_Q$ can be fetched from a pre-calculated table, not shown in the figure, for example.

Figure 2:
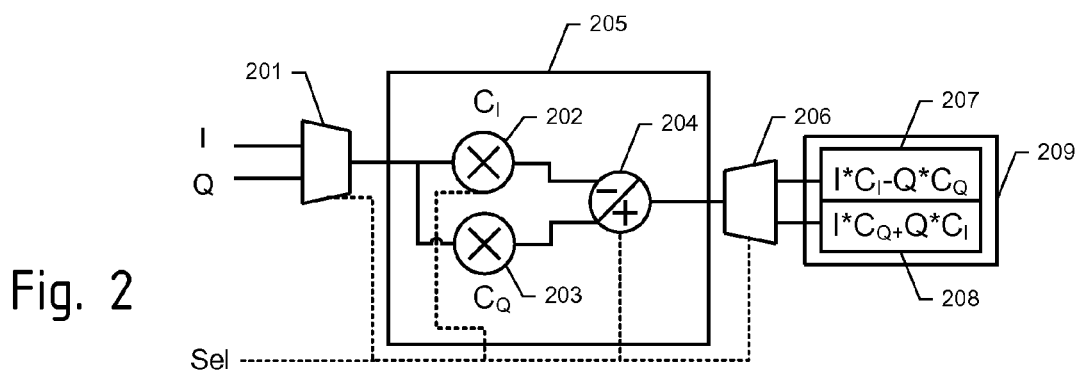
FIG. 2: a pipelined variant of the known device of FIG. 1.

FIG. 2 illustrates a variant of the full butterfly circuit, or Half Butterfly, which adopts a pipeline approach. The multiplexer 201 and the de-multiplexer 206 are used to compute separately the real part 207 $I \cdot C_I - Q \cdot C_Q$ and the imaginary part 208 $I \cdot C_Q + Q \cdot C_I$ in the arithmetic block 205 that has only two multipliers 202, 203 and one adder 204. The results are stored in complex register 209.

Conventional DFT implementations that make use of real general purpose multipliers are sub-optimal because they do not take into considerations the fact that the possible twiddle factors $W_N^{kn}$ and the $C_I$, $C_Q$ coefficients can not take any value, but are necessarily included in a predefined finite set. The twiddle factors $W_N^{kn}$ are the $N^{th}$ order complex roots of the unit and, therefore, their real and imaginary are parts have certain symmetries that are not exploited in conventional DFT implementations.

Preferably, the circuit of the present invention uses a set of multiplier-by-constant modules whose number is equal to the number K of different possible coefficients, disregarding their signs, plus 1 (the extra module is needed to take into account roots of the unity of the form $\pm\sqrt{2}/2 \pm j \cdot \sqrt{2}/2$, that have the same coefficient, in absolute value, for the real and imaginary part).

A simple formula for an approximate computation of the frequency span of each DFT is given by:

$$\Delta f = \frac{1}{T_s}\left(\frac{M}{N} + \frac{1}{N_{\it eff}}\right) \quad (6)$$

where $T_S$ is the sample period, N is the length of the input signal for the DFT (expressed in number of points), M is the number of calculated DFT lines (with M≤N), and $N_{\it eff}$ is the effective DFT length (how many points are effectively integrated).

The number K of different coefficients depends on the number N of the DFT points. Supposing that N is an integer multiple of 8 and exploiting the symmetry of the $N^{th}$ order complex roots of the unit, the number K of different coefficients is equal to N/4+1. This formula gives for N=8, 16, 24, 32, 40, 48 the following values of K=3, 5, 7, 9, 11, 15. It is straightforward to extend this to a DFT engine supporting other values of N, or any finite choice of values of K. If for instance N is intended to be configurable in the range of values {8, 16, 24, 32}, the number of needed coefficients K is (K(24)+K(32)−$K_C$), being $K_C$ the number of common coefficients between N=24 and N=32 (those having complex argument 0° or 45°.

Figure 3:
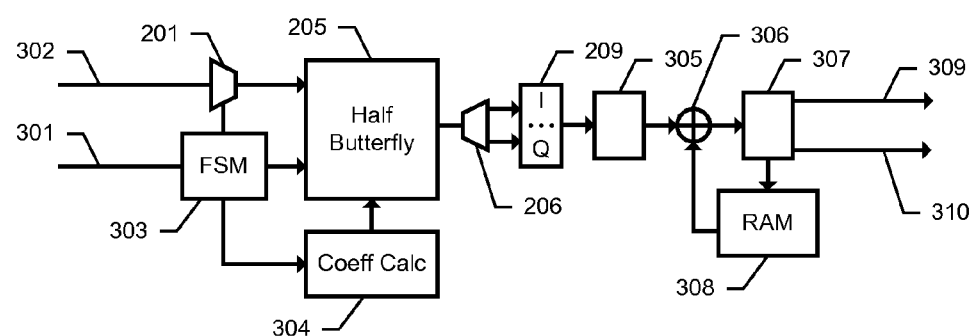
FIG. 3: the structure of a DFT engine according to an aspect of the present invention.

An embodiment of the invention will now be described with reference to FIG. 3. The Half butterfly arithmetic block 205, is functionally equivalent to the block designated under the same number in FIG. 2. Its structure is however different, as it will be explained in the following.

A control logic unit 303 drives the operation of the DFT engine. It makes use of incoming configuration parameters 301 to select the data to be processed 201 from an input buffer 302. Configuration parameters 301 and input data in buffer 302 can have various sources. In the case of a GNSS receiver, for example, configuration may be provided by a non represented CPU, and that the input data could be generated by a correlation unit. Other configuration are however possible. The control logic unit 303 also controls the selection of the current coefficients pair 304 and determines if the partial terms should be added or subtracted in the half butterfly unit 205, depending whether the real or imaginary part of equation (4) is being processed.

The Half Butterfly 205 calculates first the real part 207 $(I \cdot C_I - Q \cdot C_Q)$ and the demultiplexer 206 drives the result to the I part of the complex result register 209. Afterwards, the Half Butterfly calculates the imaginary part 208 $(I \cdot C_Q + Q \cdot C_I)$ and stores the result in the Q part of the complex result register 209.

The complex result 209 is optionally multiplied by a constant factor by scaling unit 305 and accumulated, together with previous DFT terms in the accumulator comprising the adder 306 and memory 308, for example a RAM.

The DFT of the invention includes preferably a saturation stage 307, to detect overflow in the accumulation RAM 308. If saturation occurs a flag 310 is activated. The DFT control logic 303 or an external control unit implement an algorithm to calculate a proper scaling factor to avoid saturation.

The DFT processing unit of the present invention is preferably arranged to disable dynamically any unused DFT line as indicated by configuration parameters 301. The input data selector 201 can be stuck to '0', reducing the toggling of the Half Butterfly 205 and scaler 305 for the discarded DFT line. Additionally, the control logic 303 can be used to update the address of the RAM 308, but avoid the unnecessary and power consuming memory read/write accesses.

Figure 4:
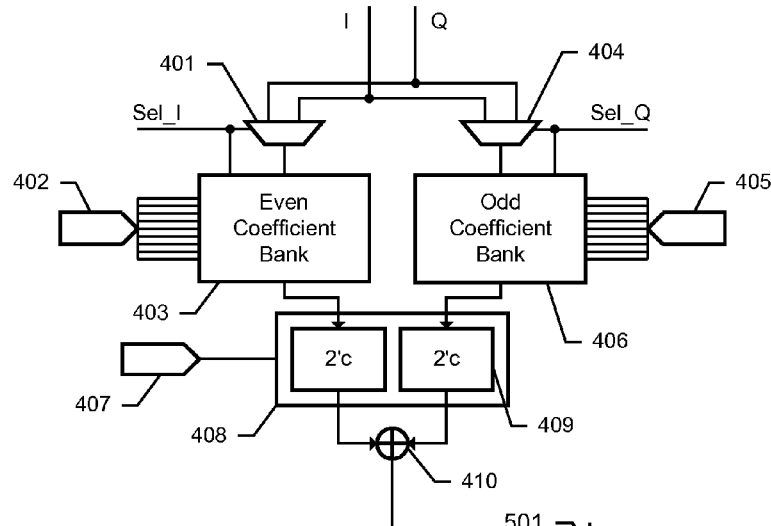
FIG. 4: a half butterfly architecture used in the structure of FIG. 3.

According to a preferred variant of the invention, the DFT processor includes a Half Butterfly 205 having the structure illustrated in FIG. 4, which calculates equation (4) in 2 steps. First the real part $(I \cdot C_I - Q \cdot C_Q)$ is calculated then the imaginary one $(I \cdot C_Q + Q \cdot C_I)$.

The structure of FIG. 4 takes advantage of the fact that, with the sole exception of the diagonal coefficient $C_{45}$, having a complex argument multiple of 45° it is always $C_i \neq C_q$; the set of coefficients can be split into two separate groups of even constant coefficients $\{C_0, C_2, \ldots, C_{k-1}\}$ and odd constant coefficients $\{C_1, C_3, \ldots, C_{k-2}\}$. The subdivision is done in a way that it never happens that two coefficient for the same group are needed to calculate the Half Butterfly terms. Block 403 contains a plurality of multipliers specifically arranged to multiply by one of the constant even coefficients $\{C_0, C_2, \ldots, C_{k-1}\}$, whereas block 406 contains a plurality of multipliers specifically arranged to multiply by one of the constant odd coefficients $\{C_1, C_3, \ldots, C_{k-2}\}$. Both blocks contain a multiplier by the $C_{45}$ coefficient.

Figure 9:
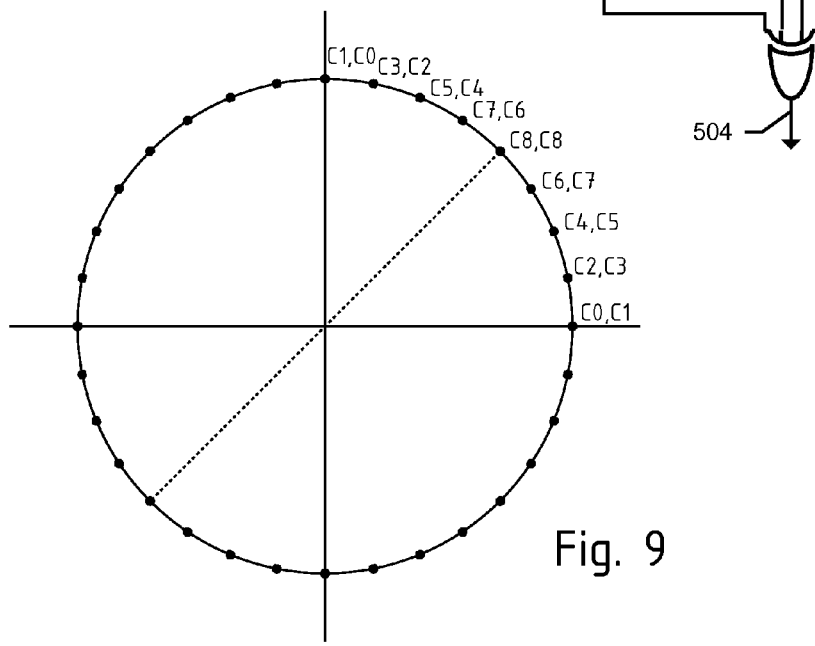
FIG. 9: the position, in a particular case, of the twiddle factors of the DFT in the complex plane.

This feature of the invention is exemplified by FIG. 9 that illustrates the position of the twiddle factors $W_{32}^{kn}$ appearing in equation (4) for the special case N=32. The $W_{32}^{kn}$ are distributed along the unity circle in the complex plane, and are symmetrically placed about the 45° dashed line. Neglecting the sign, that can be computed trivially, the coefficient $C_Q$ and $C_I$ must necessarily take one of the values $C_0$,-$C_8$ shown. With the sole exception of the 45° twiddle factor, all the terms of equation (4) involve one coefficient from the finite set of constant numbers $\{C_0, C_2, C_4, C_6, C_8\}$ and another coefficient from the finite set of constant numbers $\{C_1, C_3, C_5, C_7, C_8\}$. The structure of the Half Butterfly unit 205 is designed to take advantage of this symmetry.

Reverting now to FIG. 4, input samples I, Q and the K coefficients are preferably coded as sign-magnitude. Eventually additional conversion logic can be added in front of the I, Q data with a small overhead in terms of area if the incoming data are not in sign-magnitude format. Magnitudes of the data and of the selected coefficients are multiplied to obtain the magnitude of the product in blocks 403 and 406. Due to the fact that the multipliers have to deal with absolute magnitudes, internal toggling and dynamic power consumption are much reduced with respect to traditional multipliers arranged to tread numbers in two's complement format.

The multiplier by constant values contained in banks 403 and 406 are preferably implemented in integer arithmetic and are highly optimized. Trivial coefficients having 0° or 90° complex argument are implemented as shift and truncation operation to further minimize area and power. If appropriate, some coefficients may deviate slightly from the theoretical value, in order to simplify the structure and reduce the power consumption of the multiplier.

In the presented example the output of the Half Butterfly is in two's complement format. Since the products calculated in 403 and 406 are encoded in sign-magnitude format, conversion blocks 409 carry out the necessary conversion, before the data are combined by adder 410. The configuration port 407 selects if the Half Butterfly is calculating the real ($I \cdot C_I - Q \cdot C_Q$) or imaginary part ($I \cdot C_Q + Q \cdot C_I$) of the complex DFT result 209. It is also necessary to know the sign of the data and the sign of the coefficients before converting the data to two's complement format. It is also possible to bypass the conversion block 409 to have a sign-magnitude coding of the outputs. The output of the adder 410 is the real or the imaginary part of one of the DFT of equation (4). According to a variant, the values I, Q are represented as unsigned integers, and the multipliers in banks 403 and 406 operate in unsigned mode. The sign of the result, computed separately, is set by acting on the two's complement units 408 and 409.

Each of the multiplier-by-constant modules contained in banks 403 and 406 is dynamically activated by the configuration bus 402 and 405 from the control unit 303. Thereby only the part of the circuitry really needed for the current DFT line calculation is active at any given moment, and the multipliers in banks 403 and 406 are in an inactive quiescent state for most of the time. Preferably the order of sum of terms in equation (4) can be rearranged (scrambling).

Figure 5:
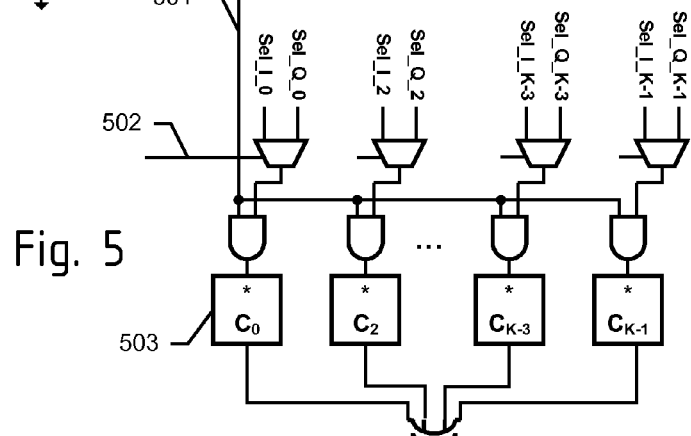
FIG. 5: a detail of the even coefficient bank, with (K+1)/2 multiplier-by-constant modules.

FIG. 5 shows a possible structure for the even coefficient bank 403. The input signal 501 is the result of selecting between I and Q performed by multiplexer 401 (FIG. 4). This signal 501 is common to all the (K+1)/2 multiplier-by-constant modules 503. The possibility of activating only the part of the circuitry really needed for the current DFT line calculation is performed using the control signals from 402 and listed as (Sel_I_0, Sel_Q_0, . . . , Sel_I_K−1, Sel_Q_K−1).

Figure 6:
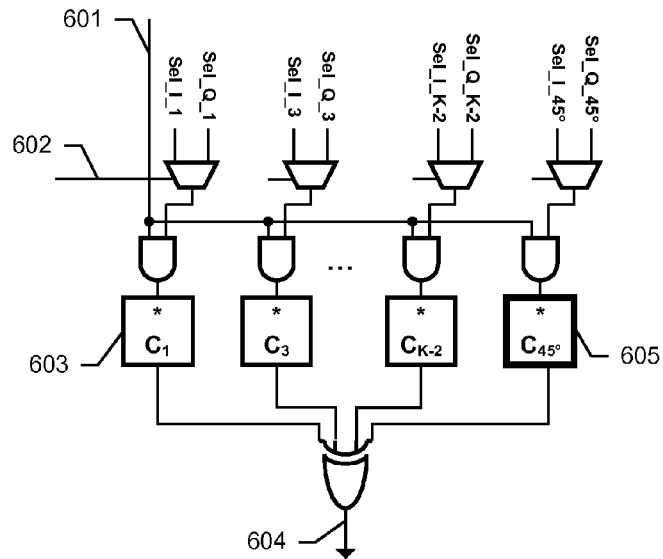
FIG. 6: a detail of the odd coefficient bank, with (K+1)/2 multiplier-by-constant modules.

A similar approach is shown in FIG. 6 for the odd coefficient bank. The input signal 601 is the result of selecting between I and Q performed by multiplexer 404. This signal 601 is common to all the (K+1)/2 multiplier-by-constant modules within 406. The possibility of activating only the part of the circuitry really needed for the current DFT line calculation is performed using the control signals from 405 and listed as (Sel_I_1, Sel_Q_1, . . . , Sel_I_K−2, Sel_Q_K−2, Sel_I_45°, Sel_Q_45°. A multiplication unit 605 with the coefficient for 45° is also available in 403, but has to be duplicated in 406. What coefficient from 403 is also marked as 605 within 406 depends on the coding of coefficients adopted.

Only 2 coefficients are needed hence only 2 multiply-by-constant units are activated simultaneously (one from each coefficient bank 403 and 406). The other multiplier-by-constant blocks have their inputs tied to 0 (no consumption due to combinatorial logic toggling).

This approach reduces the toggling activity of about 30% if compared to a standard multiplier approach. Moreover the architecture is totally combinatorial and no pipeline stages are present inside it. Typically a pipeline in digital circuitry is implemented using simple flip-flop based registers that are not optimized in term of area and power consumption. Avoiding them area and power are minimized.

The order of the DFT lines being calculated is managed inside the control logic blocks 303 and 304. The DFT lines can be calculated with a programmable order so that the post-processing computation load for a CPU is reduced.

With reference to FIGS. 5 and 6 and supposing that $C_I = C_0$ and $C_Q = C_1$ the calculation of equation (4) can be performed in 2 steps described below.

Step 1: calculation of real part of equation (4): Sel_I_0=1, Sel_Q_1=1, Sel_I_x=0 if x≠0, Sel_Q_x=0 if x≠1, Sel_I=1, Sel_Q=1, DFT_Re=1. Then $A = I \cdot C_0$, $B = -Q \cdot C_1$ Step 2: calculation of imaginary part of equation (4): Sel_I_1=1, Sel_Q_0=1, Sel_I_x=0 if x≠1, Sel_Q_x=0 if x≠0, Sel_I=0, Sel_Q=0, DFT_Re=0. Then $D = Q \cdot C_0$, $C = I \cdot C_1$ GNSS Receiver Embodiment DFT algorithms are generally known in the art and described in the technical literature. In the following only the aspects specific to GNSS implementation will be discussed with reference to FIGS. 7 and 8.

Figure 7:
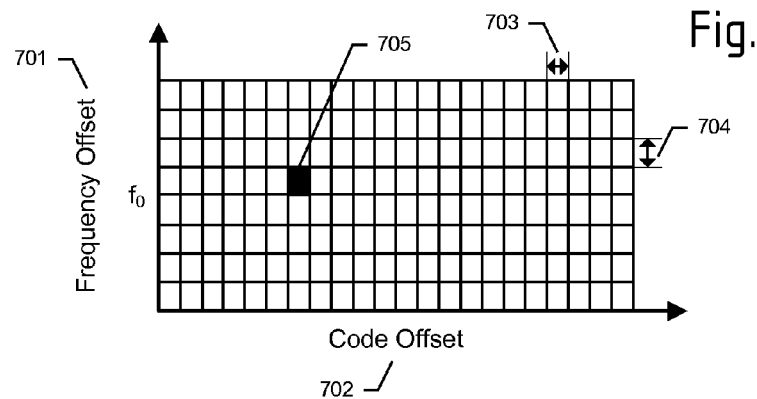
FIG. 7: a representation of the search space in GNSS satellite acquisition.
Figure 8:
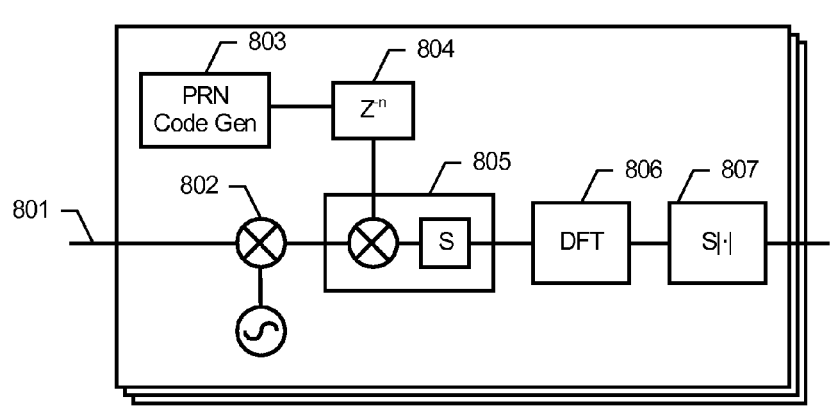
FIG. 8: a GNSS receiver architecture.

With reference to FIG. 7, the acquisition and tracking of a GPS space vehicle (SV) requires the determination of the frequency/code bin 705. For this purpose specific resources are needed to determine the code phase offset bin 703 and the Doppler bin 704. In the case that there is no estimation of one of more of the above cited parameters, a full search over the entire frequency/code search space should be performed.

A serial search approach, where a frequencies sweep over all possible Doppler of the incoming GPS signal and a code phases sweep over 1023 possible values for a GPS PRN (Pseudo Random Noise) code, is a widely used method for the acquisition step in a GNSS system.

A parallel frequency approach may be used to speed up the acquisition process. The receiver architecture illustrated in FIG. 8 carries out a parallel search in the frequency domain calculating the DFT 806 of the signal generated from the correlation 805 between the processed GNSS signals 802 and a locally generated replica 804 of the PRN for a given SV.

The line-of-sight velocity of the satellite referred to the receiver cause a Doppler effect in the order of +/−10 KHz. A step frequency step of 150 Hz is the minimum required for a low level GNSS signal scenario.

The gain of the correlated signal 805 has the format sinc $(x) := \sin(x) \cdot x^{-1}$ where $x = \pi f T$. Applying this sinc envelope to the DFT transfer function it becomes evident that all the DFT lines will be affected by an amplitude loss with the exception of the centre frequency line f (that correspond to the Doppler frequency) under the condition that the PRN code is perfectly aligned. Otherwise no peak is present.

The aforementioned properties justify the use of a reduced number M of DFT lines from N data samples out of the correlator 805.

The present invention further concerns a DFT processor for a reduced number of spectrum lines to reduce hardware complexity and power consumption.

By careful application of appropriate design constraints specific to the SV navigation and analysis of the DFT algorithm an optimised hardware architecture can be realised for embedding frequency-domain analysis efficiently into a GNSS chipset.

The invention claimed is:

1. A device for computing a discrete Fourier transform (DFT) transform comprising a plurality of multiplier circuits, each multiplier circuit being arranged to multiply an input value by a predetermined constant coefficient corresponding to a real or imaginary part of a twiddle factor of the DFT, including a control logic unit operatively arranged to activate a pair of said multiplier circuits corresponding to a twiddle factor of the DFT, and an adder, operatively arranged to sum or subtract outputs of the multiplier circuits of said pair, obtaining a real or an imaginary part of a DFT term.

2. The device of claim 1, wherein the multiplier circuits are arranged in two separate banks.

3. The device of claim 2, wherein a multiplier circuit for a constant coefficient is duplicated in both banks.

4. The device of claims 1, including an accumulator, operatively arranged to accumulate several DFT terms.

5. The device of claim 1, wherein said multiplier circuits operate on integer numbers in sign/magnitude format, or in unsigned integer format.

6. The device of claim 1, wherein the inputs to the multiplier circuits that are not activated by the control logic unit are forced to a constant value.

7. The device of claim 1, wherein the device is included in a signal processor for processing radiolocalization signals in a Global Navigation Satellite Systems (GNSS) receiver.

8. The device of claim 1, wherein the predetermined constant coefficient is a predetermined coefficient of a finite set of different constant coefficients,
wherein the multiplier circuits are arranged in two separate banks,
wherein only one multiplier circuit for a constant coefficient is duplicated in both banks, and
wherein the pair of said multiplier circuits include one multiplier circuit in each bank.

9. A method of multiplying a value by a member of a finite set of constant coefficients, comprising steps of:
selectively routing a first and a second part of an input value to a pair of multiplier circuits of a plurality of multiplier circuits, each multiplier circuit being arranged to multiply the input value by a predetermined constant coefficient of a finite set of different constant coefficients, the predetermined constant coefficient corresponding to a real or imaginary part of a twiddle factor of a discrete Fourier transform (DFT), wherein the multiplier circuits are arranged in two separate banks, and wherein only one multiplier circuit for a constant coefficient is duplicated in both banks, and one multiplier circuit of the pair of multiplier circuits in each bank is activated, corresponding to a twiddle factor of the DFT;
multiplying the first or second part of the input value by the respective coefficient in said finite set; and
adding or subtracting outputs of the multiplier circuits of said pair, obtaining a real or an imaginary part of a DFT term.

10. A method for computing a computing a discrete Fourier transform (DFT) transform, comprising:
multiplying, via each multiplier circuit of a plurality of multiplier circuits, an input value by a predetermined constant coefficient corresponding to a real or imaginary part of a twiddle factor of the DFT, wherein a control logic unit is operatively arranged to activate a pair of said multiplier circuits corresponding to a twiddle factor of the DFT; and
performing, via an adder, an addition or a subtraction of outputs of the multiplier circuits of said pair, obtaining a real or an imaginary part of a DFT term.

11. The method of claim 10, wherein the multiplier circuits are arranged in two separate banks.

12. The method of claim 10, wherein a multiplier circuit for a constant coefficient is duplicated in both banks.

13. The method of claim 10, further comprising accumulating, via an accumulator, several DFT terms.

14. The method of claim 10, wherein said multiplier circuits operate on integer numbers in sign/magnitude format, or in unsigned integer format.

15. The method of claim 10, wherein the inputs to the multiplier circuits that are not activated by the control logic unit are forced to a constant value.

16. The method of claim 10, wherein the method is performed by a signal processor for processing radiolocalization signals in a Global Navigation Satellite Systems (GNSS) receiver.

17. The method of claim 10, wherein the predetermined constant coefficient is a predetermined coefficient of a finite set of different constant coefficients,
wherein the multiplier circuits are arranged in two separate banks,
wherein only one multiplier circuit for a constant coefficient is duplicated in both banks, and
wherein the pair of said multiplier circuits include one multiplier circuit in each bank.

18. An apparatus for computing a discrete Fourier transform (DFT) transform, comprising:
means for multiplying, via each multiplier circuit of a plurality of multiplier circuits, an input value by a predetermined constant coefficient corresponding to a real or imaginary part of a twiddle factor of the DFT, wherein a control logic unit is operatively arranged to activate a pair of said multiplier circuits corresponding to a twiddle factor of the DFT; and
means for performing, via an adder, a sum or a subtraction of the outputs of the multipliers of said pair, obtaining the real or the imaginary part of a DFT term.

19. The apparatus of claim 18, wherein the multiplier circuits are arranged in two separate banks.

20. The apparatus of claim 18, wherein a multiplier circuit for a constant coefficient is duplicated in both banks.

21. The apparatus of claim 18, further comprising means for accumulating, via an accumulator, several DFT terms.

22. The apparatus of claim 18, wherein said multiplier circuits operate on integer numbers in sign/magnitude format, or in unsigned integer format.

23. The apparatus of claim 18, wherein the inputs to the multiplier circuits that are not activated by the control logic unit are forced to a constant value.

24. The apparatus of claim 18, wherein the apparatus is included in a signal processor for processing radiolocalization signals in a Global Navigation Satellite Systems (GNSS) receiver.

25. The apparatus of claim 18, wherein the predetermined constant coefficient is a predetermined coefficient of a finite set of different constant coefficients,
wherein the multiplier circuits are arranged in two separate banks, wherein only one multiplier circuit for a constant coefficient is duplicated in both banks, and wherein the pair of said multiplier circuits include one multiplier circuit in each bank.

26. An apparatus for multiplying a value by a member of a finite set of constant coefficients, comprising:

a control logic unit to selectively route a first and a second part of an input value to a pair of multiplier circuits of a plurality of multiplier circuits, each multiplier circuit being arranged to multiply the input value by a predetermined constant coefficient of a finite set of different constant coefficients, the predetermined constant coefficient corresponding to a real or imaginary part of a twiddle factor of a discrete Fourier transform (DFT), wherein the multiplier circuits are arranged in two separate banks, and wherein only one multiplier circuit for a constant coefficient is duplicated in both banks, and one multiplier circuit of the pair of multiplier circuits in each bank is activated, corresponding to a twiddle factor of the DFT;

each multiplier circuit of the plurality of multiplier circuits to multiply the first or second part of the input value by the respective coefficient in said finite set; and an adder to add or subtract outputs of the multiplier circuits of said pair, obtaining a real or an imaginary part of a DFT term.

27. An apparatus for multiplying a value by a member of a finite set of constant coefficients, comprising:

means for selectively routing a first and a second part of an input value to a pair of multiplier circuits of a plurality of multiplier circuits, each multiplier circuit being arranged to multiply the input value by a predetermined constant coefficient of a finite set of different constant coefficients, the predetermined constant coefficient corresponding to a real or imaginary part of a twiddle factor of a discrete Fourier transform (DFT), wherein the multiplier circuits are arranged in two separate banks, and wherein only one multiplier circuit for a constant coefficient is duplicated in both banks, and one multiplier circuit of the pair of multiplier circuits in each bank is activated, corresponding to a twiddle factor of the DFT;

means for multiplying the first or second part of the input value by the respective coefficient in said finite set; and means for adding or subtracting outputs of the multiplier circuits of said pair, obtaining a real or an imaginary part of a DFT term.

* * * * *